(12) United States Patent
Li et al.

(10) Patent No.: US 9,013,734 B2
(45) Date of Patent: Apr. 21, 2015

(54) METHOD AND APPARATUS FOR CONTROLLING PAUSES IN PRINTING

(71) Applicants: Peking University Founder Group Co., Ltd., Beijing (CN); Peking University, Beijing (CN); Beijing Founder Electronics Co., Ltd., Beijing (CN); Peking University Founder R&D Center, Beijing (CN)

(72) Inventors: Dan Li, Beijing (CN); Xiaohui Wen, Beijing (CN); Zhihong Liu, Beijing (CN)

(73) Assignees: Peking University Founder Group Co., Ltd., Beijing (CN); Peking University, Beijing (CN); Beijing Founder Electronics Co., Ltd., Beijing (CN); Peking University Founder R&D Center, Beijing (CN)

(\*) Notice: Subject to any disclaimer, the term of this patent is extended or adjusted under 35 U.S.C. 154(b) by 0 days.

(21) Appl. No.: 14/130,652

(22) PCT Filed: Sep. 26, 2012

(86) PCT No.: PCT/CN2012/082045
§ 371 (c)(1),
(2) Date: Jan. 2, 2014

(87) PCT Pub. No.: WO2013/044802
PCT Pub. Date: Apr. 4, 2013

(65) Prior Publication Data
US 2014/0146346 A1    May 29, 2014

(30) Foreign Application Priority Data
Sep. 30, 2011   (CN) .......................... 2011 1 0299742

(51) Int. Cl.
*G06K 15/00* (2006.01)
*G06F 3/12* (2006.01)

(52) U.S. Cl.
CPC .............. *G06K 15/408* (2013.01); *G06F 3/121* (2013.01); *G06F 3/1234* (2013.01); *G06F 3/1285* (2013.01)

(58) Field of Classification Search
CPC ...... G06K 15/40; G06K 15/408; G06F 3/121; G06F 3/1229; G06F 3/1234; G06F 3/1285
USPC ........ 358/1.1, 1.14, 1.15, 400, 401, 434, 437, 358/438
See application file for complete search history.

(56) References Cited

U.S. PATENT DOCUMENTS

| 5,815,289 | A  | * | 9/1998 | Yoshida et al. | ............... 358/468 |
| 2008/0158593 | A1 | * | 7/2008 | Jo et al. | ......................... 358/1.15 |
| 2010/0141988 | A1 | | 6/2010 | Kai | |

FOREIGN PATENT DOCUMENTS

| CN | 101154083 A | 4/2008 |
| CN | 101246327 A | 8/2008 |
| CN | 101751237 A | 6/2010 |
| JP | 63184827 A | 7/1988 |

\* cited by examiner

*Primary Examiner* — Thomas D Lee
(74) *Attorney, Agent, or Firm* — The Webb Law Firm

(57) ABSTRACT

The present invention provides a method and an apparatus for controlling pauses in printing. The method includes: transmitting imaging data to an imaging unit, and transmitting one printing signal while transmitting the imaging data of each page which are printed when the imaging unit receives the printing signal; generating a command of pausing printing when receiving a cause of pausing; stopping transmitting the printing signal to the imaging unit according to the command of pausing printing, printing the imaging data is stopped when the imaging unit cannot receive the printing signal.

6 Claims, 3 Drawing Sheets

METHOD AND APPARATUS FOR CONTROLLING PAUSES IN PRINTING

CROSS-REFERENCE TO RELATED APPLICATIONS

This application is the United States national phase of International Application No. PCT/CN2012/082045 filed Sep. 26, 2012, and claims priority to Chinese Patent Application No. 201110299742.5 filed Sep. 30, 2011, the disclosures of which are hereby incorporated in their entirety by reference.

FIELD OF THE INVENTION

The present invention relates to the field of printing technique, and particularly, to a method and an apparatus for controlling pauses in printing.

BACKGROUND OF THE INVENTION

In recent years, digital printing has been a rapidly developing printing technique which adopts a way of directly inputting, processing, and printing data for printing. A digital printing device processes original data into dot-matrix data through a host, processes the dot-matrix data into data suitable for imaging (i.e., imaging data) through a control system, and then controls an imaging unit to directly form images from the imaging data. A common workflow for a digital printing device of on-demand inkjet printing is: when a printing substrate (e.g., paper) reaches a predetermined position, under the control of the control system, a piezoelectric crystal in a printhead of the imaging unit will generate pulses to extrude inks, and directly eject mist ink droplets toward a surface of the printing substrate to form images.

In a large-scale printing production using a digital printer, it is usually required during printing to pause a printing device and change a new paper roll to continue printing due to the limited length of paper roll. There is an problem of chronological order of printing (the firstly printed page is taken as a front side and the later printed page is taken as a back side regardless of the contents thereof) during printing due to different physical arrangement positions of the printhead for printing images on the front side and the printhead for printing images on the back side. Therefore, when controlling pauses in printing of a digital printer, not only it is necessary to ensure that the number of printed pages of both images on the front side and images on the back side are identical when the printing is paused, but also it is necessary to ensure that images on the front side and images on the back side continue to output a new page following the particular page number when the printing is paused after the printing is resumed, that is, to ensure that images on the front side as well as images on the back side can be well aligned, and the numbers of printed pages are continuous without missing or repeating a page during the process of pausing and resuming printing.

In the prior art, the transmission of data to a back-end data receiving unit is stopped in order to pause data printing when the host finds a cause of pausing (e.g., the user commands to pause printing).

The inventors find that at least the following problems exist in the existing technique of pauses of printing: a certain amount of data will be buffered in the storage space of the data receiving unit of the printer, and after the host stops transmitting data, the printer can truly stop printing only after finishing printing the buffered data in the data receiving unit, that is, the existing pause function has a certain degree of lag: if the host has already transmitted all data to be printed presently to the data receiving unit of the printing system, the pause operation can be no longer possible, in other words, even it is paused, the printer can only stop printing actually after finishing printing all current job data, and thus a true pause function cannot be realized.

SUMMARY OF THE INVENTION

The present invention intends to provide a method and an apparatus for controlling pauses in printing to solve the problems of pausing printing in related techniques.

An embodiment of the present invention provides a method for controlling pauses in printing, comprising:
  transmitting imaging data to an imaging unit, and transmitting a printing signal whilst transmitting said imaging data of each page, wherein said imaging data are printed when said imaging unit receives said printing signal;
  generating a command of pausing printing when a cause of pausing is received;
  stopping transmitting said printing signal to said imaging unit according to said command of pausing printing, wherein printing said imaging data is stopped when said imaging unit cannot receive said printing signal.

Preferably, stopping printing said imaging data when said imaging unit cannot receive said printing signal comprises:
  stopping printing after said imaging data of a current page have been printed when said imaging unit cannot receive said printing signal.

Preferably, said imaging data include double-sided imaging data, and said method for controlling pauses in printing further includes:
  counting the printing signals for the imaging data on a front side and the printing signals for the imaging data on a back side, respectively.

Further preferably, said stopping transmitting said printing signal to said imaging unit includes:
  stopping transmitting said printing signal for the imaging data on the front side immediately upon receipt of said command of pausing printing;
  continuing transmitting said printing signal for the imaging data on the back side;
  stopping transmitting said printing signal for the imaging data on the back side immediately when a count of said printing signals for the imaging data on the back side is equal to that of said printing signals for the imaging data on the front side.

Preferably, after stopping transmitting said printing signal to said imaging unit according to said command of pausing printing, the method further includes:
  receiving a command of resuming printing;
  continuing transmitting the rest of said imaging data to said imaging unit, and transmitting one said printing signal whilst transmitting said imaging data of each page.

An embodiment of the present invention also provides an apparatus for controlling pauses in printing, which includes:
  a data receiving unit, for receiving job data from a host;
  a data processing unit, for converting said received job data to imaging data;
  a control unit, for transmitting a command of pausing printing upon receipt of a cause of pausing from said host;
  a printing unit, for transmitting said imaging data to an imaging unit, transmitting one printing signal whilst transmitting said imaging data of each page, and stopping transmitting said printing signal to said imaging unit upon receipt of said command of pausing printing, wherein said imaging data are printed when said imaging unit receives said printing signal, and printing said imaging data is stopped when said imaging unit cannot receive said printing signal.

Preferably, stopping printing said imaging data when said imaging unit cannot receive said printing signal includes:

stopping printing after said imaging data of a current page have been printed when said imaging unit cannot receive said printing signal.

Preferably, said imaging data include double-sided imaging data, and said apparatus for controlling pauses in printing further includes:

a detecting unit, for counting the printing signals for the imaging data on a front side and the printing signals for the imaging data on a back side, respectively, and determining whether a count of said printing signals for the imaging data on the back side is equal to that of said printing signals for the imaging data on the front side.

Further preferably, said printing unit for stopping transmitting said printing signal to said imaging unit upon receipt of said command of pausing printing specifically includes:

said printing unit for stopping transmitting said printing signal for the imaging data on the front side immediately upon receipt of said command of pausing printing; continuing transmitting said printing signal for the imaging data on the back side; and stopping transmitting said printing signal for the imaging data on the back side immediately when the count of said printing signals for the imaging data on the back side is equal to that of said printing signals for the imaging data on the front side.

Preferably, said control unit is further for transmitting a command of resuming printing; said printing unit continues transmitting the rest of said imaging data to said imaging unit when said printing unit receives said command of resuming printing, and transmits one said printing signal whilst transmitting said imaging data of each page.

The method and apparatus for controlling pauses in printing of the present invention overcome the problems of pausing printing existing in the prior art and reduces breakdowns of printing because pauses of printing is achieved by way of stopping transmitting the printing signal.

BRIEF DESCRIPTION OF THE DRAWINGS

The drawings as described herein are to provide further understandings of the present invention and constitute a part of the application, in which.

Wherein, the reference numbers of the figures are as follows: 201—data receiving unit; 202—data processing unit; 203—control unit; 204—detecting unit; 205—printing unit.

DETAILED DESCRIPTION OF THE EMBODIMENTS

For better understanding of the present invention to the person skilled in the art, detailed descriptions of the invention will be illustrated by reference of the drawings and embodiments. The illustrative embodiments of the present invention and the descriptions thereof are used to explain the present invention without improperly limiting the present invention. It is noted that the printer in the description also covers imprinter in the meanwhile.

Embodiment 1

Figure 1:
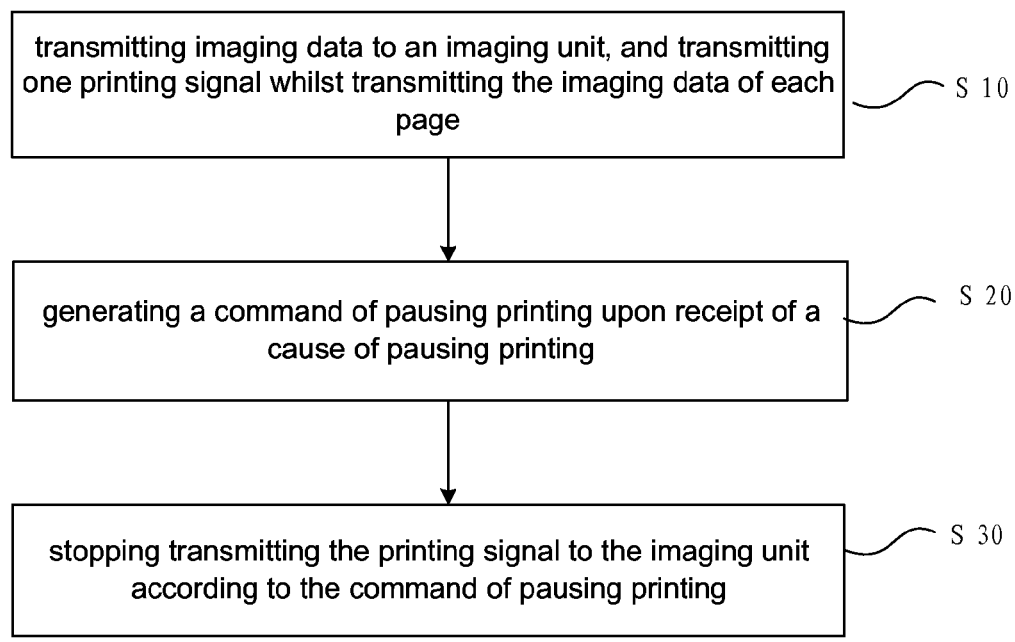
FIG. 1 shows a flow diagram of a method for controlling pauses in printing according to embodiment 1 of the present invention.

A flow of a method for controlling pauses in printing of this embodiment is shown as FIG. 1, including the following steps:

Step S10, transmitting imaging data to an imaging unit (e.g., printhead), and transmitting one printing signal whilst transmitting the imaging data of each page, wherein the imaging data is printed when the imaging unit receives the printing signal;

Step S20, generating a command of pausing printing upon receipt of a cause of pausing printing;

Step S30, stopping transmitting the printing signal to the imaging unit according to the command of pausing printing, wherein printing the imaging data is stopped when the imaging unit cannot receive the printing signal.

In the prior art, when a printing needs to be paused, transmission of job data is stopped through a host such that a control system accordingly pauses transmission of the imaging data so as to pause the printing, which therefore causes a series of problems: for instance buffered imaging data will be continuously output to be printed (i.e., there is lag for the pause), or paper is printed half-way. However in the present invention, the printing signal is a synchronized signal in the process of printing. The imaging unit prints the imaging data upon receipt of the printing signal; and the imaging unit stops printing the imaging data when it cannot receive the printing signal. It should be noted that each printing of a digital printing device is conducted in units of jobs, and each job may include data of one page or multiple pages. The host processes the original data into dot-matrix data and transmits the dot-matrix data to a digital printing control system in units of pages. The control system buffers the received dot-matrix data of each page. After a printing is started, the control system generates a printing signal required for printing image of each page, and the imaging data of each page read from the buffer to the printhead is transmitted together with the printing signal so as to be printed by the printhead. Upon receipt of the printing signal required for printing the image of each page, which serves as a starting signal for printing each page, the printhead starts printing the image of one page until the printing of that one page is finished. If the control system stops generating the printing signal required for print image of each page during the process of printing, the printhead will stop printing after finishing one page of the printing job which is being printed (as no new printing signal is received), wait until the control system resumes to generate the printing signal, and continue to start printing the next page until all pages of the printing job are printed. This method utilizes synchronizing function of the printing signals to enable pauses of printing, and adopts a way of stopping transmitting the printing signal to pause printing. Therefore, the method overcomes the problems of pausing printing in the existing techniques and reduces breakdowns of printing.

Further, in the present embodiment, when the host finds a cause of pausing (e.g., an operation that the user sends a command for pausing printing), it is not necessary to stop transmitting the job data. Instead, the cause of pausing is transmitted to the control system which pauses printing by stopping the transmission of printing signals. Because the host may continue transmitting the job data, it facilitates the control system buffering the job data, and time for resuming printing is thus shortened.

Preferably, when the imaging unit cannot receive any printing signal, the printing is stopped after finishing printing the imaging data of the current page. This may overcome the problem of incomplete printing of the image of the current page. Preferably, the imaging data include double-sided imaging data, and this method also includes: counting the printing signals for the imaging data on the front side and the printing signals for the imaging data on the back side, respectively. The number of pages printed on the front side and the number of pages printed on the back side may be determined by counting the printing signals, respectively. It is noted that in the description the front side is referred to the page printed firstly and the back side is referred to the page printed later regardless of the contents thereof.

More preferably, step S30 includes: stopping transmitting the printing signal for the imaging data on the front side immediately upon receipt of the command of pausing printing; continuing transmitting the printing signal for the imaging data on the back side; stopping transmitting the printing signal for the imaging data on the back side immediately when the count of the printing signals for the imaging data on the back side is equal to that of the printing signals for the imaging data on the front side. This preferred method determines the number of pages printed on the front side and the number of pages printed on the back side by counting the printing signals so as to control the number of pages printed on the back side during the process of pausing printing and ensure that the number of pages printed on the back side is equal to that printed on the front side, such that it is ensured that the images on the front side and on the back side are well aligned during the process of pausing and resuming printing, and the number of the printed pages are continuous without missing or repeating a page.

Preferably, after step S30 the method further includes: receiving a command of resuming printing; continuing transmitting the rest of the imaging data to the imaging unit, and transmitting one printing signal whilst transmitting the imaging data of each page. Resuming printing after pausing printing is achieved by this preferred embodiment.

Embodiment 2

Figure 2:
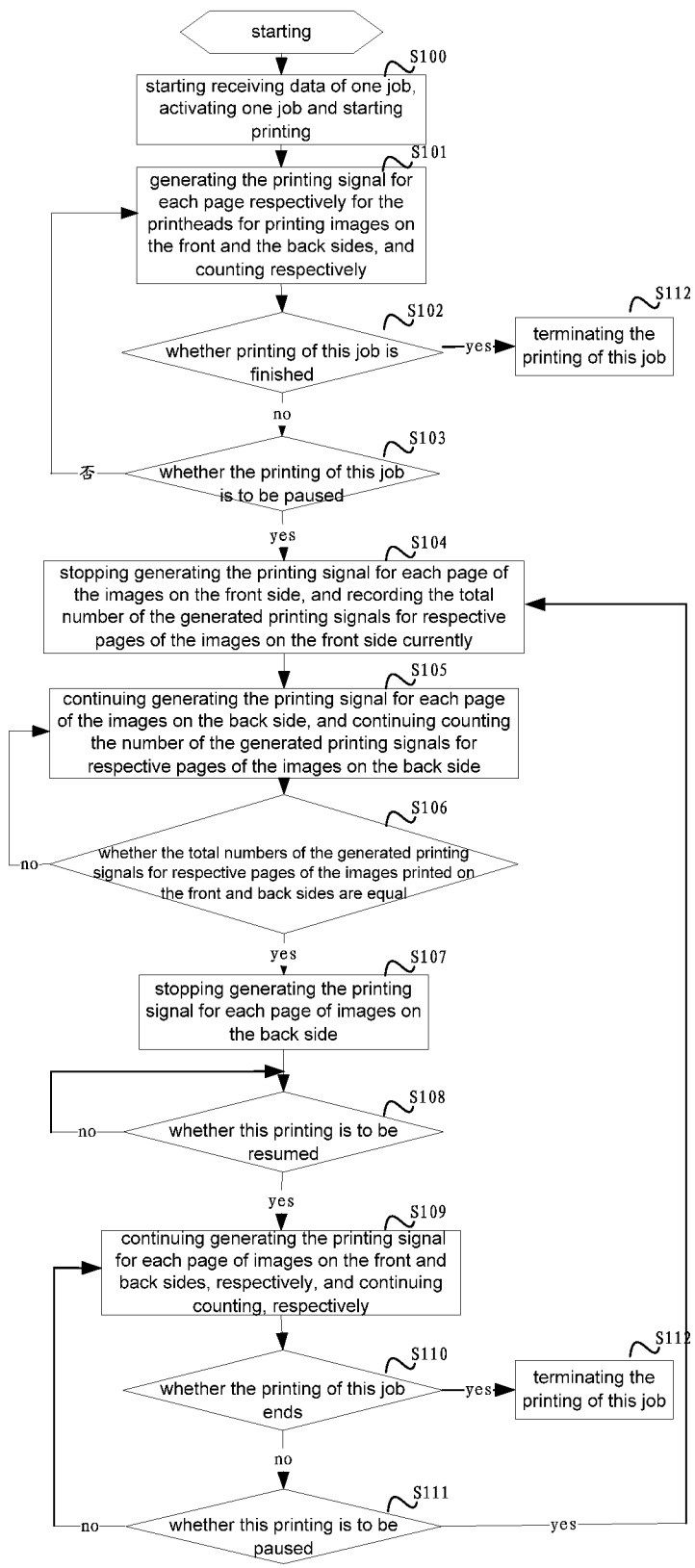
FIG. 2 shows a flow diagram of a method for controlling pauses in printing according to embodiment 2 of the present invention.

A flow of a method for controlling pauses in printing of this embodiment is shown in FIG. 2, including the following steps:

Step S100, starting receiving one job, activating this job and starting printing after one page of this job has been received and processed into imaging data.

Step S101, generating a printing signal for each page respectively for the printhead for printing images on the front side and the printhead for printing images on the back side; after the printheads receive this printing signal, activating the printing of one page; and counting the generated printing signals for respective pages of the images printed on the front side and on the back side, respectively.

Step S102, determining whether the printing of this job is finished, and if yes, proceeding to step S112; otherwise proceeding to step S103, and determining whether the printing of this job is to be paused.

Step S103, determining whether the printing of this job is to be paused, and if yes, proceeding to step S104; otherwise going back to step S101, and continuing generating the printing signal for each page of images on the front side and on the back side of this job.

Step S104, stopping generating the printing signal for each page of the images on the front side, and recording the total number of the printing signals for respective pages of the images on the front side generated during printing the current job. It is noted that at this time generating the printing signal for each page of the images on the back side is not stopped.

Step S105, continuing generating the printing signal for each page for the printhead printing images on the back side, and continuing counting the number of the generated printing signals for respective pages of the images on the back side.

Step S106, determining whether the total number of the generated printing signals for respective pages of the images printed on the front side and that of the generated printing signals for respective pages of the images printed on the back side are equal, if yes, representing that the number of pages of images printed on the front side is equal to that of images printed on the back side, and proceeding to step S107; otherwise proceeding to step S105.

Step S107, when the total number of the generated printing signals for respective pages of the images printed on the front side and that of the generated printing signals for respective pages of the images printed on the back side are equal, stopping generating the printing signal for each page of images on the back side. At this time, the total number of the generated printing signals for respective pages of images printed on the front side and that of the generated printing signals for respective pages of the images printed on the back side are equal for this job, i.e., it is ensured that the number of pages of images printed on the front side and that of pages of images printed on the back side are equaled at the time of pausing.

Step S108, determining whether this printing is to be resumed, and if yes, proceeding to step S109; otherwise repeating this step and waiting for a command of resuming printing.

Step S109, after resuming printing, continuing generating the printing signal for each page for the printheads printing images on the front side and printing images on the back side, respectively, and continuing counting (or recounting for both sides) based on the counts of the printing signals for respective pages of images printed on the front side and on the back side recorded after previous pause of printing.

Step S110, determining whether this printing ends, and if yes, proceeding to step S112, and terminating this printing; otherwise proceeding to step S111.

Step S111, determining whether this printing is to be paused again during the process of printing, and if yes, proceeding to step S104; otherwise going back to step S109.

Step S112, terminating this printing.

Embodiment 3

Figure 3:
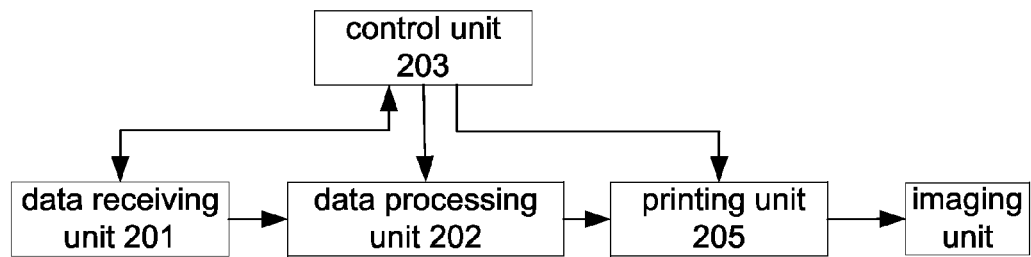
FIG. 3 shows a block diagram of an apparatus for controlling pauses in printing according to embodiment 3 of the present invention.

FIG. 3 shows a block diagram of an apparatus for controlling pauses in printing according to this embodiment, including:

a data receiving unit 201, for receiving job data from a host;
a data processing unit 202, for converting the received job data into imaging data;
a control unit 203, for transmitting a command of pausing printing upon receipt of a cause of pausing from the host;
a printing unit 205, for transmitting the imaging data to an imaging unit, transmitting one printing signal whilst transmitting the imaging data of each page, and stopping transmitting the printing signal to the imaging unit upon receipt of the command of pausing the printing, wherein the imaging data are printed when the imaging unit receives the printing signal, and printing the imaging data is stopped when the imaging unit cannot receive the printing signal.

In this embodiment, when the host finds the cause of pausing (e.g., the operation that the user sends a command for pausing printing), it is not necessary to stop transmitting the job data. Instead, the cause of pausing is forwarded to the control unit, and the printing is paused by way of stopping the transmission of the printing signals by the control unit and the printing unit. This apparatus for controlling pauses in printing overcomes the problems of pausing printing in the existing techniques and reduces breakdowns of printing.

Preferably, when the imaging unit cannot receive the printing signal, the printing is stopped after printing the imaging data of the current page is finished.

Preferably, the imaging data include double-sided imaging data, and this apparatus for controlling pauses in printing further includes: a detecting unit, for counting the printing signals for the imaging data on the front side and the printing signals for the imaging data on the back side, respectively, and determining whether the count of the printing signals for the imaging data on the back side is equal to that of the printing signals for the imaging data on the front side. When the printing is paused, Due to the sequence order of physical arrangement of the printhead for printing images on the front side and the printhead for printing images on the back side, it would be necessary to control the printing signal for each page of image printed on the front side and on the back side, respectively, so as to ensure that the number of the generated printing signals for respective pages of the images printed on the front side and that of the generated printing signals for respective pages of the images printed on the back side are equal after the printing is paused. The printhead will finish printing the image of one page according to the printing signal for each page, that is, the number of pages of the images printed on the front side and that of pages of the images printed on the back side are equal after the printing is paused.

More preferably, the printing unit is used for stopping transmitting the printing signal for the imaging data on the front side upon receipt of the command of pausing printing; continuing transmitting the printing signal for the imaging data on the back side; and stopping transmitting the printing signal for the imaging data on the back side immediately when the determination result from the detecting unit shows that the count of the printing signals for the imaging data on the back side is equal to that of the printing signals for the imaging data on the front side.

Preferably, the control unit is further used for transmitting a command of resuming printing; continuing the transmission of the rest of the imaging data to the imaging unit when the printing unit receives the command of resuming printing, and transmitting one printing signal whilst the imaging data of each page is being transmitted.

Embodiment 4

Figure 4:
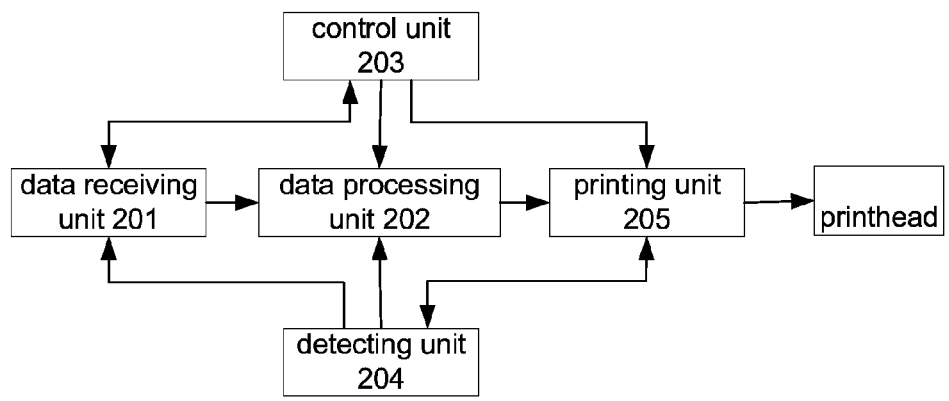
FIG. 4 shows a block diagram of an apparatus for controlling pauses in printing according to embodiment 4 of the present invention.

FIG. 4 shows a block diagram of an apparatus for controlling pauses in printing according to this embodiment, including:
  a data receiving unit 201, for receiving data, and respectively storing the received data according to whether the received data belong to the images printed on the front side or the images printed on the back side.
  a data processing unit 202, for processing the received data into imaging data which can be transmitted to a printhead for direct printing, and buffering the imaging data.
  a control unit 203, for receiving a signal indicating that one page of the job has been received from the data receiving unit 201, and transmitting a printing starting signal of this job respectively to the printhead for printing the images on the front side and to the printhead for printing the images on the back side in the printing unit 205. Specifically, the printing starting signal of this job is transmitted to the printing unit 205 immediately when one page of this job has been received and processed into the imaging data. The control unit 203 is further used to transmit a command of pausing printing and a command of resuming printing to the printing unit 205.
  a detecting unit 204, for determining whether there is enough space for receiving the data of the one page when the data receiving unit 201 receives the data; for determining whether there is enough space for buffering after the data processing unit 202 processes the received data into the imaging data; for determining whether the job being printed is finished when the printing unit 205 prints the data; for counting the printing signals generated by the printing unit 205 for respective pages of the imaging data on the front side and for respective pages of the imaging data on the back side, respectively; for determining whether the total number of the printing signals generated by the printing unit 205 for respective pages of the images printed on the front side and that of the printing signals generated by the printing unit 205 for respective pages of the images printed on the back side are consistent.
  a printing unit 205, for generating the printing signal required for printing the image of each page. After the control unit 203 activates one job and starts printing, generating the printing signal for each page respectively for the printhead for printing the images on the front side and the printhead for printing the images on the back side, wherein the printhead activates the printing of the image of one page according to this signal; and for reading the corresponding imaging data from the buffer of the data processing unit 202 when generating the printing signal for each page, and transmitting the imaging data to the printhead together with the printing signal for each page so as to be printed by the printhead.

The imaging data are transmitted to the printhead in units of pages, then this control apparatus transmits the printing signal for each page to the printhead, and the printhead activates the printing of the image of one page according to the received printing signal. If the control apparatus stops transmitting the printing signal for the image of each page to the printhead, the printhead stops printing after finishing printing the page being printed currently and waits for the printing signal for the next page to re-activate the printing of the image of the next page. This apparatus realizes functions of pausing and resuming printing by simply controlling the printing signals transmitted to the printhead for printing the images on the front side and the printhead for printing the images on the back side, respectively. Because the printing signals are in units of pages, the phenomena of incomplete printing of one page will not occur when the printing is paused, and it is ensured that the images on the front side and the images on the back side can be well aligned after the printing is resume, and the number of printed pages is not repeated or missed.

It can be seen from the above description that the present invention enables pauses at any time during the process of printing, and enables the images on the front side and on the back side to be correctly printed and well aligned after the printing is resumed. The present invention can be easily realized, and it reduces the complexity of controlling pauses in the double-sided printing in digital printing and improves the accuracy of pausing printing when double-sided printing is on-going.

Apparently, the person skilled in the art should understand that respective units or steps of the present invention as described above may be implemented by general computing apparatuses. They can be integrated on a single computing apparatus or distributed on a network formed by a plurality of computing apparatuses. Optionally, they may be implemented by program codes executable by computing apparatus, and therefore, they can be stored in a storage device to be executed by the computing apparatus, or they can be respectively made into respective integrated circuit units, or a plurality of units or steps thereof can be made into a single integrated circuit unit. As such, the present invention is not limited to any particular combination of hardware and software.

The foregoing descriptions are merely preferred embodiments of the present invention but not used to limit the present invention. There are various modifications and variations of the present invention for the person skilled in the art. Any modification, equivalent replacement, improvement, and the like within the spirit and principle of the present invention should be included in the protection scope of the present invention.

What is claimed is:

1. A method for controlling pauses in printing, comprising the steps of:
    transmitting imaging data to an imaging unit, and transmitting a printing signal while transmitting said imaging data of each page, wherein said imaging data are printed when said imaging unit receives said printing signal;
    generating a command of pausing printing upon receipt of a cause of pausing; and
    stopping transmitting said printing signal to said imaging unit according to said command of pausing printing, wherein printing said imaging data is stopped when said imaging unit cannot receive said printing signal;
    wherein said imaging data include double-sided imaging data, and wherein said method for controlling pauses in printing further includes the steps of:
    counting the printing signals for the imaging data on a front side and the printing signals for the imaging data on a back side, respectively, and
    wherein the steps of transmitting said printing signal to said imaging unit includes the steps of:
    stopping transmitting said printing signal for the imaging data on the front side immediately upon receipt of said command of pausing printing;
    continuing transmitting said printing signal for the imaging data on the back side; and
    stopping transmitting said printing signal for the imaging data on the back side immediately when a count of said printing signals for the imaging data on the back side is equal to that of said printing signals for the imaging data on the front side.

2. The method for controlling pauses in printing according to claim 1, wherein the step of stopping printing said imaging data when said imaging unit cannot receive said printing signal includes:
    stopping printing after said imaging data of a current page have been printed when said imaging unit cannot receive said printing signal.

3. The method for controlling pause in printing according to claim 1, wherein after the step of stopping transmitting said printing signal to said imaging unit according to said command of pausing printing, the method further includes the steps of:
    receiving a command of resuming printing; and
    continuing transmitting the rest of said imaging data to said imaging unit, and transmitting one said printing signal while transmitting said imaging data of each page.

4. An apparatus for controlling pauses in printing, comprising:
    a data receiving unit for receiving job data from a host;
    a data processing unit for converting the received job data into imaging data;
    a control unit for transmitting a command of pausing printing when receiving a cause of pausing from said host; and
    a printing unit for transmitting said imaging data to an imaging unit, transmitting one printing signal while transmitting said imaging data of each page, and stopping transmitting said printing signal to said imaging unit upon receipt of said command of pausing printing, wherein said imaging data are printed when said imaging unit receives said printing signal, and wherein printing said imaging data is stopped when said imaging unit cannot receive said printing signal
    wherein said imaging data include double-sided imaging data, and said apparatus for controlling pauses in printing further includes:
    a detecting unit for counting said printing signals for the imaging data on a front side and said printing signals for the imaging data on a back side, respectively, and for determining whether a count of said printing signals for the imaging data on the back side is equal to that of said printing signals for the imaging data on the front side, and
    wherein said printing unit for stopping transmitting said printing signal to said imaging unit when receiving said command of pausing printing specifically includes:
    said printing unit for stopping transmitting said printing signal for the imaging data on the front side immediately upon receipt of said command of pausing printing; for continuing transmitting said printing signal for the imaging data on the back side; and for stopping transmitting said printing signal for the imaging data on the back side immediately when the count of said printing signals for the imaging data on the back side is equal to that of said printing signals for the imaging data on the front side.

5. The apparatus for controlling pauses in printing according to claim 4, wherein stopping printing said imaging data when said imaging unit cannot receive said printing signal includes:
    stopping printing after said imaging data of a current page have been printed when said imaging unit cannot receive said printing signal.

6. The apparatus for controlling pauses in printing according to claim 4, wherein said control unit is further used for transmitting a command of resuming printing; and wherein said printing unit continues transmitting the rest of said imaging data to said imaging unit when said printing unit receives said command of resuming printing, and transmits one said printing signal while transmitting said imaging data of each page.

* * * * *